United States Patent
Iversen et al.

(10) Patent No.: US 8,981,610 B2
(45) Date of Patent: Mar. 17, 2015

(54) ROTOR FOR AN ELECTRIC DRIVE MOTOR OF A REFRIGERANT COMPRESSOR

(75) Inventors: Frank Holm Iversen, Padborg (DK); Marten Nommensen, Flensburg (DE); Ekkehard Handke, Grossenwiehe (DE)

(73) Assignee: Secop GmbH, Flensburg (DE)

( * ) Notice: Subject to any disclaimer, the term of this patent is extended or adjusted under 35 U.S.C. 154(b) by 1359 days.

(21) Appl. No.: 12/411,609

(22) Filed: Mar. 26, 2009

(65) Prior Publication Data

US 2009/0251022 A1    Oct. 8, 2009

(30) Foreign Application Priority Data

Apr. 4, 2008   (DE) .......................... 10 2008 017 276

(51) Int. Cl.
*H02K 1/28*     (2006.01)
*H02K 1/27*     (2006.01)

(52) U.S. Cl.
CPC .................................. *H02K 1/2786* (2013.01)
USPC ................................ 310/156.12; 310/156.26

(58) Field of Classification Search
USPC ............... 310/67 R, 156.12, 156.19, 156.22, 310/156.26, 156.44, 40 MM
IPC ............................................. H02K 21/12,21/22
See application file for complete search history.

(56) References Cited

U.S. PATENT DOCUMENTS

| | | | |
|---|---|---|---|
| 3,727,302 A * | 4/1973 | Phelon | 29/596 |
| 3,828,212 A | 8/1974 | Harkness et al. | |
| 4,012,651 A | 3/1977 | Burson | |
| 4,182,027 A | 1/1980 | Benezech | |
| 4,217,508 A * | 8/1980 | Uzuka | 310/156.26 |
| 5,216,306 A | 6/1993 | Nakazawa et al. | |
| 5,675,204 A | 10/1997 | Kusumoto et al. | |
| 5,705,871 A * | 1/1998 | Suzuki et al. | 310/156.44 |
| 5,998,902 A * | 12/1999 | Slede et al. | 310/156.19 |
| 7,262,526 B2 | 8/2007 | Shiga et al. | |
| 7,548,006 B2 * | 6/2009 | Yu | 310/156.12 |
| 2006/0017342 A1 | 1/2006 | Park | |
| 2006/0076845 A1 | 4/2006 | Park et al. | |
| 2007/0057582 A1 | 3/2007 | Hashiba et al. | |
| 2007/0152521 A1 * | 7/2007 | Park | 310/156.26 |

FOREIGN PATENT DOCUMENTS

| | | |
|---|---|---|
| DE | 10 2005 058 249 A1 | 3/2007 |
| EP | 1 404 004 A1 | 3/2004 |
| EP | 1 536 543 A1 | 6/2005 |
| EP | 1 670 118 A1 | 6/2006 |
| FR | 2734958 A1 | 12/1996 |

* cited by examiner

*Primary Examiner* — Michael Andrews
(74) *Attorney, Agent, or Firm* — McCormick, Paulding & Huber LLP

(57) ABSTRACT

The invention concerns a rotor (1) for an electric drive motor of a refrigerant compressor with a cylinder ring (2), several permanent magnets (14) resting on the radial inside of the cylinder ring (2), each permanent magnet (14) forming a ring section, and fixing elements (15) between the permanent magnets (14), said fixing elements (15) engaging a fixing geometry (4, 16) of the cylinder ring (2). It is endeavoured to simplify the manufacturing of such a rotor. For this purpose, the cylinder ring (2) is located in a carrier (5), which comprises a bottom (6) and a circumferential wall (7), the permanent magnets (14, 14a, 14b) resting on the bottom (6), and each fixing element (15, 15a, 15b) comprising at least one projection (17, 18), which covers a side (24) of the permanent magnet (14, 14a, 14b) facing away from the bottom (6).

15 Claims, 4 Drawing Sheets

ROTOR FOR AN ELECTRIC DRIVE MOTOR OF A REFRIGERANT COMPRESSOR

CROSS REFERENCE TO RELATED APPLICATION

Applicant hereby claims foreign priority benefits under U.S.C. §119 from German Patent Application No. 10 2008 017 276.6 filed on Apr. 4, 2008, the contents of which are incorporated by reference herein.

FIELD OF THE INVENTION

The invention concerns a rotor for an electric drive motor of a refrigerant compressor with a cylinder ring, several permanent magnets resting on the radial inside of the cylinder ring, each permanent magnet forming a ring section, and fixing elements between the permanent magnets, said fixing elements engaging a fixing geometry of the cylinder ring.

BACKGROUND OF THE INVENTION

In hermetically enclosed refrigerant compressors, as known from, for example, domestic refrigerators or freezers or air-conditioning systems, it is endeavoured to achieve a small component height in order to obtain a large effective space for the cooling. One way of keeping the height of the compressor small is to use a drive motor with an external rotor, as a drive motor with an external rotor has a smaller component height as a drive motor with an internal rotor and the same performance.

A rotor with the features mentioned in the introduction is, for example, known from FR 2 734 958 A1. Here, the permanent magnets are arranged on the inside of the cylinder ring, and are tightened against each other in the circumferential direction by means of holdfasts, which engage the cylinder ring.

However, it takes a substantial effort to build such a rotor into a motor, as a very careful handling is required.

Another possibility of fixing permanent magnets in an external rotor involves the insertion of permanent magnets in pockets, which are arranged in the rotor. Such a solution is, for example, known from EP 1 536 543 A1.

Further, there is a possibility of gluing the permanent magnets onto the cylinder ring. Such a solution is, for example, known from US 2006/0076845 A1.

However, the use of adhesives is not unproblematic. Also providing a plastic housing with pockets, into which the permanent magnets are inserted, involves a substantial effort.

SUMMARY OF THE INVENTION

The invention is based on the task of making the manufacturing of a rotor simple.

With a rotor as mentioned in the introduction, this task is solved in that the cylinder ring is located in a carrier, which comprises a bottom and a circumferential wall, the permanent magnets resting on the bottom, and each fixing element comprising at least one projection, which covers a side of the permanent magnet facing away from the bottom.

With this embodiment, it is achieved that the permanent magnets are at the same time fixed in several spatial directions. In the radial direction, the permanent magnets are held by the cylinder ring. They cannot deflect further outwards than the cylinder ring permits. At the same time, the permanent magnets are held by the fixing elements, so that they cannot deflect radially inwards either. In this case, a diameter reduction of the ring comprising the permanent magnets would be required, which reduction is, however, prevented by the fixing elements. However, the permanent magnets cannot be moved in the axial direction either. In one direction, the carrier hinders such a movement, the bottom of the carrier preventing the movement of the permanent magnets. Thus, a relatively robust design of the rotor is available, which makes it possible also to handle the rotor in a serial production. A finished rotor will remain in the state, which it has once assumed. It must not be feared that a careless treatment will make the permanent magnets leave their predetermined positions.

Preferably, the radial outside of the bottom comprises a circumferential step, on which the cylinder ring bears in the axial direction. The bottom serves the purpose of connecting the rotor to a centrally arranged shaft. When the bottom is provided with a step on the radial outside, the position, in which the permanent magnets are arranged, can be axially further removed from the fixing point of the bottom to the shaft, so that a favourable bearing position for the rotor in a motor can be achieved. The area of the bottom radially inside the step then has a sufficient distance to the stator, so that here there is no risk of an involuntary contact. Nevertheless, outstanding magnetic properties are achieved.

Preferably, a part of the radial extension of the permanent magnets rests on the step. Thus, radially inside the permanent magnets, the bottom already has a sufficient distance from the permanent magnets, so that the permanent magnets can be brought to the correct axial position in relation to the stator, without risking that this position is disturbed by the bottom.

Preferably, the carrier has at least one opening radially outwards. Such an embodiment is particularly advantageous, when there is a risk that oil inside the refrigerant compressor drips into the bottom. This oil can then escape radially outwards through the opening. Thus, a gathering of oil is prevented.

Preferably, the opening is located in axial extension of at least one fixing element. Then, the opening can also be used to position the fixing element and thus also the permanent magnets. The opening forms an undisplaceable marking, so that an installer can easily recognise the location of the fixing element.

Preferably, at least one fixing element extends into the opening. Thus, together with the opening, the fixing element forms a rotation protection, that is, the permanent magnets can no longer be displaced in the circumferential direction in relation to the carrier.

Preferably, the opening is formed by bending a flap out from the carrier. The flap is punched out of the carrier on three sides and can then be bent out. This has the particular advantage that the flap can also be used to cause a balancing of the finished rotor. In the case of an imbalance, such a flap can, for example, be at least partly shortened to re-establish a concentric run.

Preferably, the permanent magnets and the fixing elements comprise an axis-parallel groove-projection arrangement. This arrangement can, for example, be formed in that the fixing elements have axis-parallel grooves, which have, for example, a cross-sectional shape of a U or a V, the permanent magnets having on their front sides correspondingly shaped projections. Thus, the fixing elements are guided in the axial direction, when inserted in the gap between neighbouring permanent magnets. This simplifies the mounting. Of course, the location can also be opposite; so that front sides of the permanent magnets have corresponding grooves and the fixing elements have projections.

Preferably, several fixing elements are connected to one another in the circumferential direction at their projections. This further simplifies the manufacturing. It is no longer necessary to handle each fixing element separately; several fixing elements can now be handled in groups and, for example, be inserted together.

It is particularly advantageous that the projections of all fixing elements form a ring that covers all permanent magnets. The ring can be closed in the circumferential direction. When all fixing elements are joined in one ring, only one single handling is required to insert the fixing elements in the rotor. Such a mounting can then easily be made in an automatic way.

Preferably, the fixing elements are made of a plastic material. Thus, they do not interfere with the magnetic circuit, but act magnetically as air gaps between the individual permanent magnets.

Preferably, at least two permanent magnets have different extensions in the circumferential direction. This means that differently sized permanent magnets are used. Thus, a zero crossing can more easily be detected. This means that an improved start behaviour and an improved electronic control of the motor are achieved.

It is also advantageous that at least two fixing elements have different extensions in the circumferential direction. Different sizes of the fixing elements in the circumferential direction causes that the distances between the permanent magnets will also be differently large. This also ensures an improved zero crossing detection and an improved start behaviour as well as an improved electronic control of the motor. However, the best behaviour is achieved if both permanent magnets with different sizes in the circumferential direction and fixing elements with different sizes in the circumferential direction are used.

It is preferred that at least the fixing element with the largest extension in the circumferential direction has an axis-parallel recess. Here, the term "axis-parallel" must not be understood in the exact mathematical sense of the word. However, the recess ensures that during injection moulding of such a fixing element at least a substantially equal wall strength is achieved. Further, such a recess can be used, for example, as application surface of a mounting tool.

Preferably, the carrier is made as a shaped sheet metal part. Thus, it is made of a sheet material, which can be shaped. Accordingly, the final shaping can be achieved during or after the mounting of the permanent magnets.

BRIEF DESCRIPTION OF THE DRAWINGS

In the following, the invention is described on the basis of preferred embodiments in connection with the drawings, showing.

DETAILED DESCRIPTION OF THE PREFERRED EMBODIMENTS

In all Figs. the same elements or elements with the same function have the same reference numbers.

Figure 1:
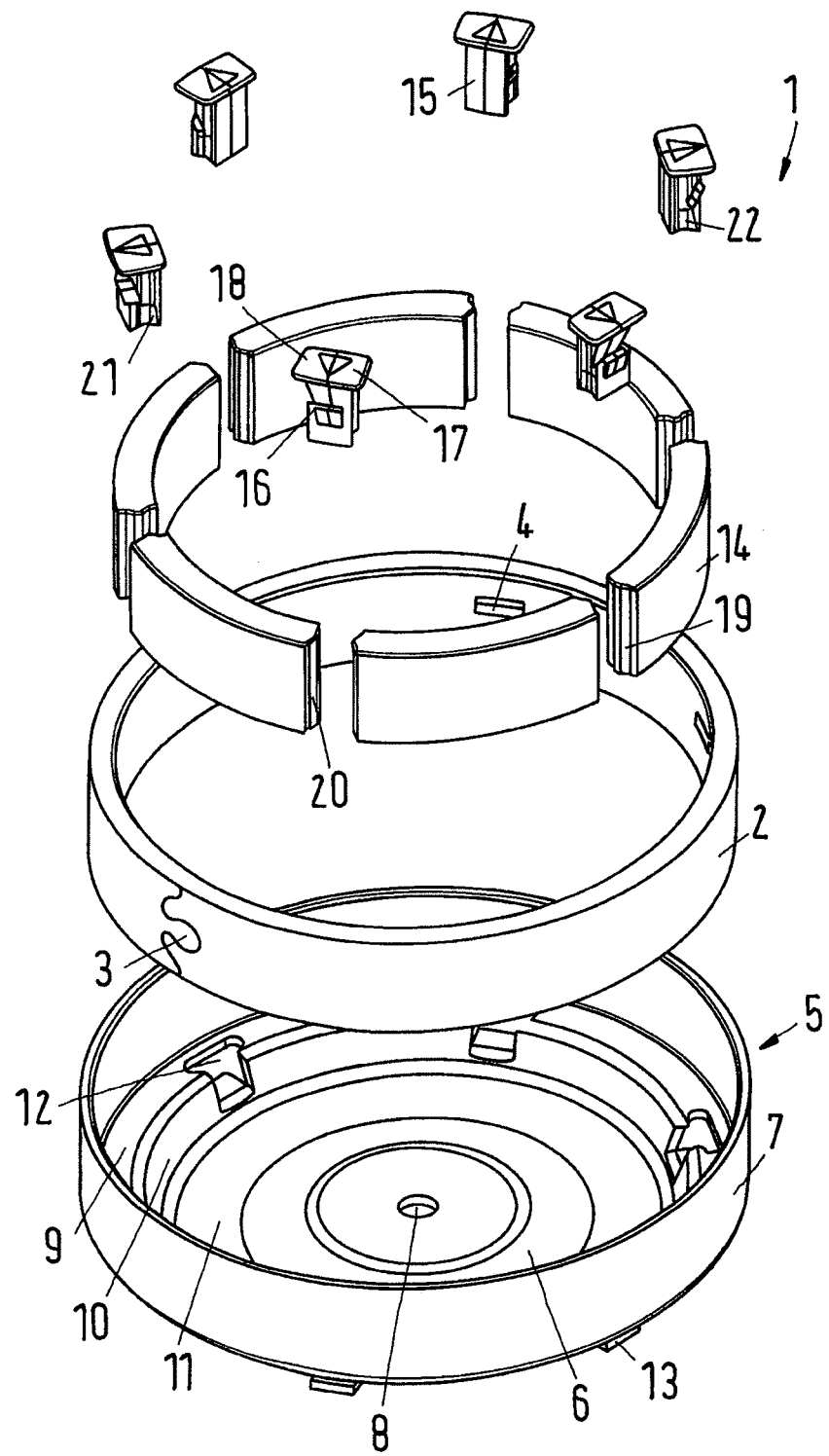
FIG. 1 is an exploded view of a rotor of a first embodiment.

FIG. 1 shows an exploded view of a rotor 1, which can be used as external rotor in the drive motor of a refrigerant compressor.

The rotor 1 comprises a cylinder ring 2, which is, for example, made of unalloyed band steel. In any case, the cylinder ring 2 is made of a magnetisable material. It has a closing geometry 3, in which both ends of the band are joined. Alternatively or additionally the two ends can be joined by means of welding. At its radial inside, the cylinder ring has several embossings 4.

Further, the rotor 1 comprises a carrier 5, which has a bottom 6 and a circumferential wall 7. In the bottom 6 a hole 8 is provided, where eventually a drive shaft can be fixed, which is then unrotatably connected to the rotor 1. The circumferential wall 7 extends in parallel to an axis, not shown in detail, of the rotor 1.

The bottom 6 of the carrier 5 has on the radial outside a step 9. Via a step wall 10 the step 9 extends into a bottom area 11 of the bottom 6. The step wall 10 comprises several openings 12 radially outwards, the openings being formed in that flaps 13 are bent out from the step wall 10 and the step 9.

The carrier 5 is made as a shaped metal part from unalloyed steel. The carrier 5 can, for example, be made in a punching tool.

Figure 2:
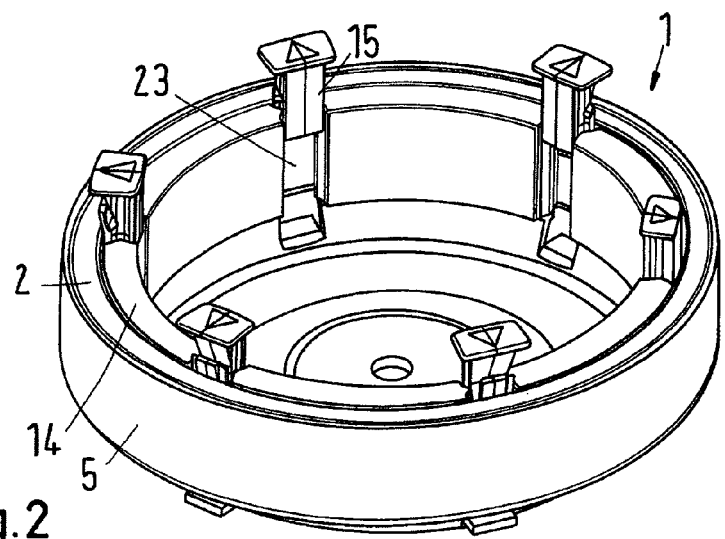
FIG. 2 is the rotor according to FIG. 1 during assembly.

As can be seen from FIG. 2, the cylinder ring 2 is inserted in the carrier 5. The cylinder ring 2 then rests on the circumferential wall 7 from the inside. During insertion, it is ensured that the embossings are aligned with the openings 12, in other words each embossing 4 and is arranged on an axis-parallel straight line with one opening 12.

The rotor 1 further comprises several permanent magnets 14, which do, however, not receive their magnetisation until the rotor 1 has been finished. The permanent magnets 14 are formed as ring sections and rest on the cylinder ring 2 from the radial inside, when they have been inserted in the cylinder ring.

Figure 4:
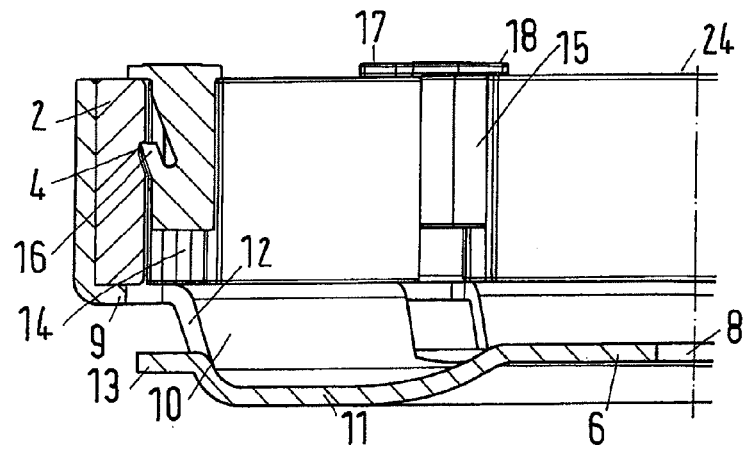
FIG. 4 is a partial section through the rotor according to FIG. 3.
Figure 5:
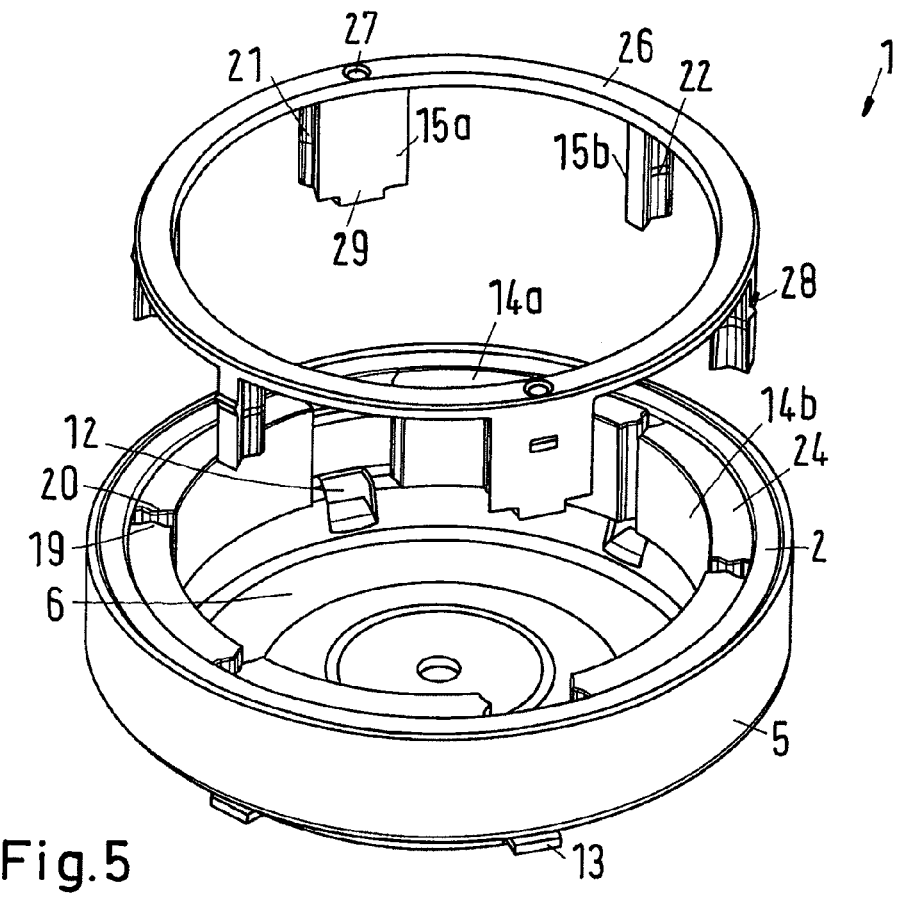
FIG. 5 is an exploded view of a rotor of a second embodiment.
Figure 6:
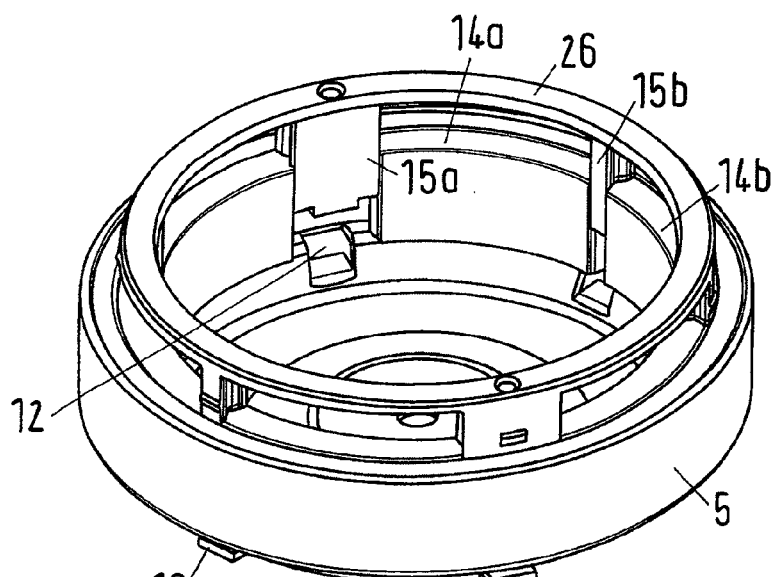
FIG. 6 is the rotor according to FIG. 5 during assembly.
Figure 7:
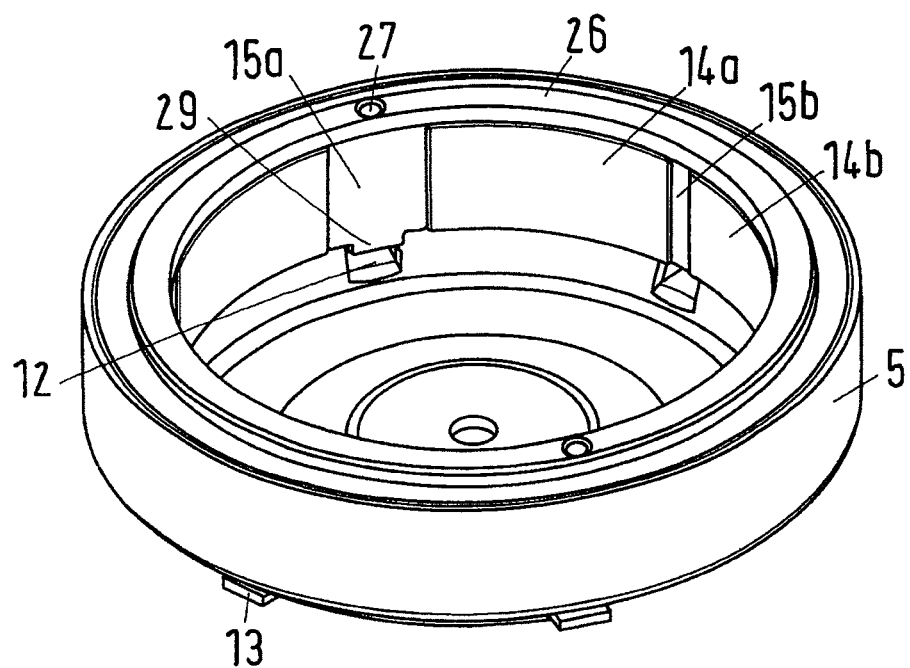
FIG. 7 is the rotor according to FIG. 5 in the finished state.
Figure 8:
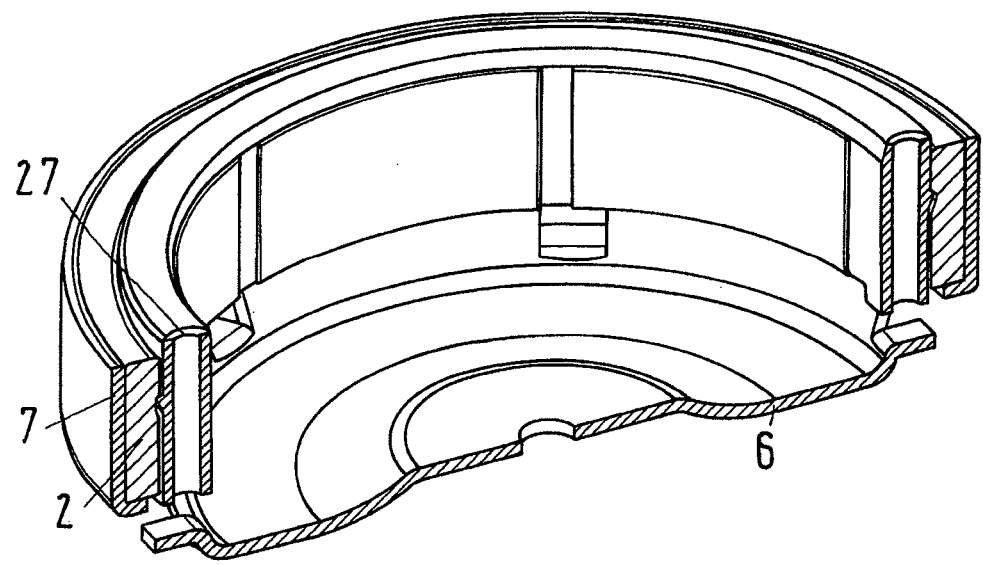
FIG. 8 is a partial section through the rotor according to FIGS. 5 to 7.

Each fixing element 15 is arranged between two neighbouring permanent magnets. On its radial outside, the fixing element 15 has a resilient tongue 16 that engages the allocated embossing 4 in the mounted state (FIG. 4). Further, each fixing element 15 has projections 17, 18 extending in the circumferential direction, said projections covering in the mounted state the two neighbouring permanent magnets 14 and the fixing element 15 in the circumferential direction.

At their circumferentially directed front sides, the permanent magnets have axis-parallel projections 19, 20. Accordingly, the fixing elements 15 have axis-parallelly directed grooves 21, 22. When, as shown in FIG. 2, the fixing elements 15 are inserted in gaps 23 between two neighbouring permanent magnets 14, the fixing elements 15 with their grooves 21, 22 are guided on the axis-parallel projections 19, 20 of the permanent magnets 14. When the fixing elements 15 have been inserted in the gaps 23 until the stop, the tongue 16 engages the embossing 4, and the projections 17, 18 rest on the side 24 of the permanent magnets 14 facing away from the bottom 6.

As appears from FIG. 4, the cylinder ring 2 rests on the step 9 with its whole radial extension. The permanent magnets 14 only rest with their radial outer area on the step 9. Radially inwards they extend somewhat over the step 9.

Figure 3:
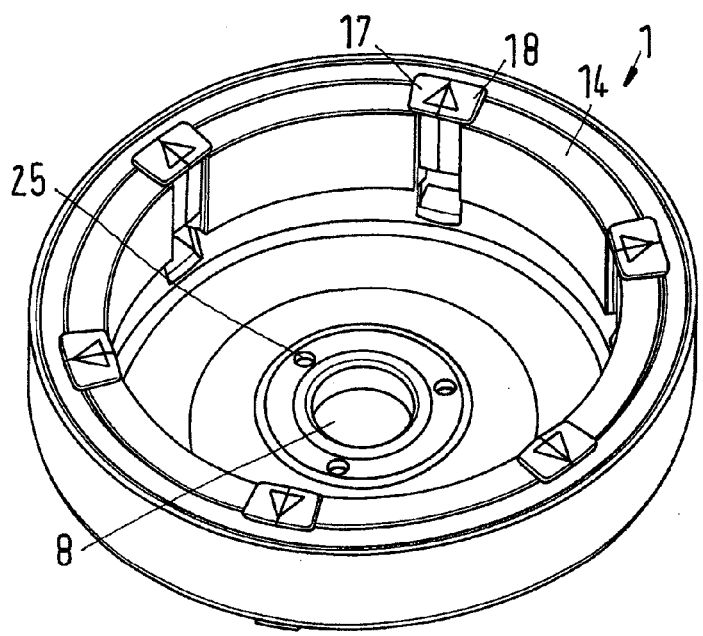
FIG. 3 is the rotor according to FIG. 1 in the finished state.

When the rotor 1 is used in the alignment shown in FIG. 3, the carrier 5 forms some kind of a pan, in which oil could gather, which is sprayed inside the housing, in which the compressor is arranged, during operation of a refrigerant compressor. This oil can, however, escape radially outwards through the openings 12.

The flaps 13 can be used to balance the rotor 1. If an imbalance is present, one of the flaps 13 may be rubbed down or otherwise shortened, or it can be bent somewhat higher to provide favourable mass conditions.

When the rotor has been assembled, as shown in FIG. 3, the hole 8 for the accommodation of the rotor shaft can be expanded and screw holes 25 may be provided to create a fixing geometry for the rotor shaft. The bottom 6 can then, if desired, be further shaped. After that, the permanent magnets 14 can be magnetised.

A rotor 1, which is made in this way, is relatively stable and insensitive to handling errors. The permanent magnets 14 remain fixed inside the cylinder ring 2. In the radial direction, they cannot move, as a movement radially outwards is prevented by the cylinder ring 2. A movement radially inwards is not possible, as the fixing elements 15 prevent the permanent magnets 14 from approaching one another. Movements in both axial directions are not possible either, as in one direction the step 9 of the bottom 6 prevents such a movement, and in the other direction the projections 17, 18 fix the permanent magnets 14.

In the embodiment according to FIGS. 1 to 4, the permanent magnets 14 have the same size and the fixing elements 15 have the same size in the circumferential direction. They can be interchanged.

The FIGS. 5 to 8 show a modified embodiment, in which it can firstly be seen (FIG. 5) that the fixing elements have different sizes in the circumferential direction. Fixing elements 15a are larger in the circumferential direction than fixing elements 15b.

Further, the fixing elements 15a, 15b are connected to one another by a ring 26, so that they can only be handled together. In a manner of speaking, the ring 26 is formed by the connection of the projections 17, 18 from neighbouring fixing elements.

The fixing elements 15a with the larger width in the circumferential direction have a recess 27, which substantially extends in an axis-parallel manner. The recess 27 causes saving of an amount of the plastic, of which the fixing elements 15a are made. Further, a substantially constant wall strength can be achieved, which is, for example, advantageous during injection moulding.

Also the permanent magnets 14a, 14b have different extensions in the circumferential direction. Thus, the permanent magnet 14a is larger in the circumferential direction than the permanent magnet 14b.

This embodiment has the advantage that the zero crossing detection for a rotor 1 with such a control is simplified. The start behaviour is improved and the electronic control is simpler.

Also the engagement geometry has changed. Instead of the tongue 16, the fixing elements 15a, 15b have on their radial outside an engagement projection 28, which again can engage embossings 4 in the cylinder ring 2.

The fixing elements 15a with the larger width have on their end facing the bottom 6 a projection 29, which engages the corresponding opening 12, when the fixing element 15a has been mounted and serves as rotation protection. The projection 29 prevents the package of cylinder ring 2, permanent magnets 14a, 14b and fixing elements 15a, 15b from being rotated in relation to the cylinder ring 2.

Otherwise, the projections 15a, 15b with lateral grooves are made exactly like the fixing elements 15 of the first embodiment.

Also in the first embodiment the fixing elements 15 can be connected to one another by a ring 26. Also some of the fixing elements 15 can be connected to one another by a part of a fixing ring 26, so that the fixing elements 15 can be handled in groups.

The fixing elements 15, 15a, 15b are preferably made of plastic and can, for example, be made by means of injection moulding. In this connection, the ring 26 can be moulded at the same time.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A rotor for an electric drive motor of a refrigerant compressor with a cylinder ring, several permanent magnets resting on the radial inside of the cylinder ring, each permanent magnet forming a ring section, and fixing elements between the permanent magnets, said fixing elements engaging a fixing geometry of the cylinder ring, wherein the cylinder ring is located in a carrier, which comprises a bottom and a circumferential wall, the permanent magnets resting on the bottom, and each fixing element comprising at least one projection, which covers a side of the permanent magnet facing away from the bottom.

2. The rotor according to claim 1, wherein the radial outside of the bottom comprises a circumferential step, on which the cylinder ring bears in the axial direction.

3. The rotor according to claim 2, wherein a part of the radial extension of the permanent magnets rests on the step.

4. The rotor according to claim 2, wherein the carrier has at least one opening radially outwards.

5. The rotor according to claim 4, wherein the opening is located in axial extension of at least one fixing element.

6. The rotor according to claim 5, wherein at least one fixing element extends into the opening.

7. The rotor according to claim 4, wherein the opening is formed by bending a flap out from the carrier.

8. The rotor according to claim 1, wherein the permanent magnets and the fixing elements comprise an axisparallel grooveprojection arrangement.

9. The rotor according to claim 1, wherein several fixing elements are connected to one another in the circumferential direction at their projections.

10. The rotor according to claim 9, wherein the projections of all fixing elements form a ring that covers all permanent magnets.

11. The rotor according to claim 1, wherein the fixing elements are made of a plastic material.

12. The rotor according to claim 1, wherein at least two permanent magnets have different extensions in the circumferential direction.

13. The rotor according to claim 1, wherein at least two fixing elements have different extensions in the circumferential direction.

14. The rotor according to claim 13, wherein at least the fixing element with the largest extension in the circumferential direction has an axis-parallel recess.

15. The rotor according to claim 1, wherein the carrier is made as a shaped sheet metal part.

* * * * *